United States Patent [19]

Persson

[11] Patent Number: 4,568,552

[45] Date of Patent: Feb. 4, 1986

[54] METHOD AND DEVICE FOR BROILING FOOD PRODUCTS

[75] Inventor: Kaj Persson, Helsingborg, Sweden

[73] Assignee: Scan Djupfryst AB, Johanneshov, Sweden

[21] Appl. No.: 578,334

[22] Filed: Feb. 9, 1984

[30] Foreign Application Priority Data

Feb. 17, 1983 [SE] Sweden .............................. 8300880

[51] Int. Cl.⁴ .......................... A23L 1/00; A47J 37/08
[52] U.S. Cl. ..................................... 426/523; 99/386; 99/390
[58] Field of Search .................. 426/523, 520; 99/386, 99/389, 390, 391, 349

[56] References Cited

U.S. PATENT DOCUMENTS

| | | | |
|---|---|---|---|
| 2,660,961 | 12/1953 | Neutelings et al. | 99/373 |
| 3,739,712 | 6/1973 | Duning | 99/390 |
| 3,965,807 | 6/1976 | Baker | 99/349 |

*Primary Examiner*—George Yeung

*Attorney, Agent, or Firm*—Pollock, Vande Sande & Priddy

[57] ABSTRACT

A method and a device for broiling food products such as hamburgers are disclosed wherein the food products are positioned between a lower heated broiling surface and an upper heated broiling surface for broiling the products by contacting corresponding sides thereof. The broiling surfaces are periodically displaced transversely relative to each other during the broiling of the food products so that the products are alternately in contact with both of the broiling surfaces and in contact substantially with only one of the broiling surfaces. The food products are intermittently displaced linearly relative to the broiling surfaces so that the food products are conveyed therebetween. The periodic displacement of the broiling surfaces transversely relative to each other and the intermittently displacement of the products linearly relative to the broiling surfaces are such that the food products are in contact substantially with only one of the broiling surfaces relative to which they are being linearly displaced.

14 Claims, 7 Drawing Figures

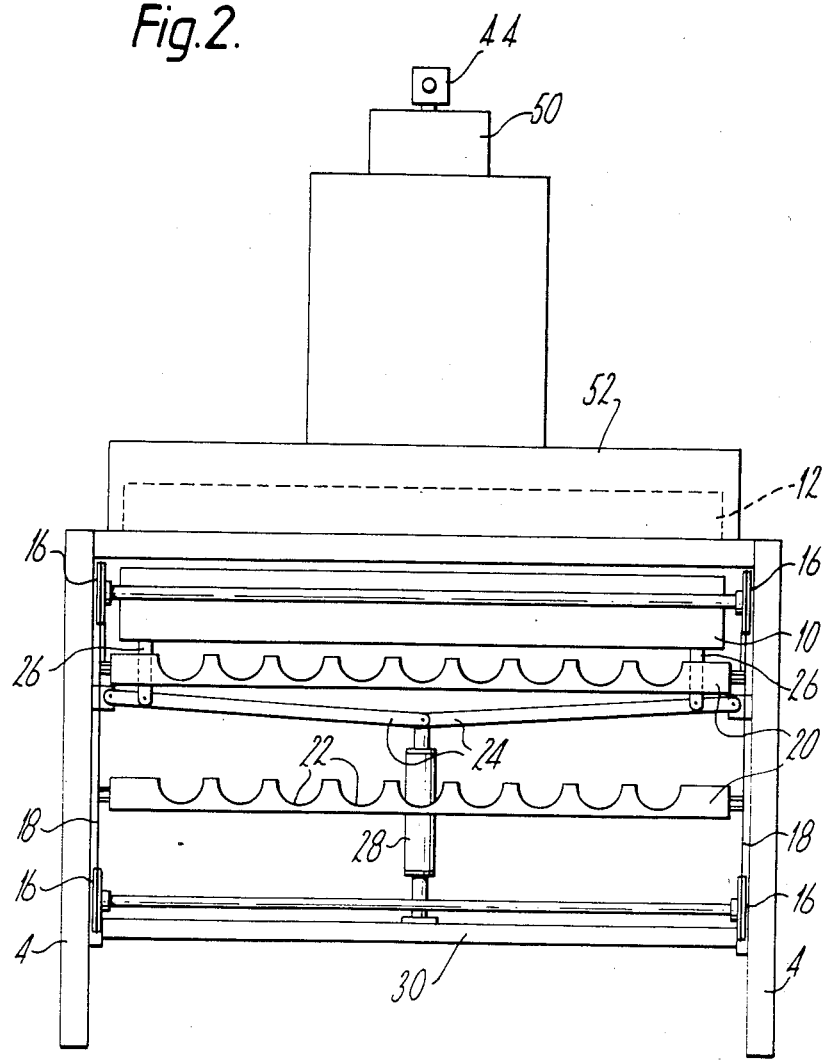

METHOD AND DEVICE FOR BROILING FOOD PRODUCTS

The present invention relates to a method for broiling or frying food products, preferably flat food products, for example hamburgers, and a device for conducting the method.

When broiling food products within the food industry, in restaurants, hamburger stands and in other places where a large number of products has to be broiled it is desirable that the broiling is not conducted batchwise but in such a way that the products are continuously prepared. Thereby, there is provided a more rational and worksaving handling of the products. In order to comply with this request it is previously known to position the products on an endless belt extending over rollers or the like and heated to a sufficient temperature for broiling the products on one side thereof during the transport. At the end of the belt the products are turned and transferred to another similar belt for being broiled on the other side. When using conventional belts having a broiling surface consisting of a metal it is difficult to avoid burning of the products in spite of using large amounts of fat. The burning causes a difficult and expensive cleaning work.

In order to avoid burning it is previously known to use belts having a coating consisting of polytetrafluoro ethylene (TEFLON). Thereby, one has also used two endless, heated belts coated with polytetrafluoro ethylene and forming a lower broiling surface and an upper broiling surface, the belts moving the products between themselves so that the products are broiled on both sides at the same time. Even if broiling belts coated with polytetrafluoro ethylene are advantageous by the fact that burning is avoided such belts have certain drawbacks. For example it is necessary that the coating is extremely thin in order not to be too much heat insulating which in turn causes that the coating has a restricted life and makes it necessary to change the broiling belts rather often.

The object of the invention is to provide a method and a device for broiling preferably flat products in which the broiling takes place at the same time on both sides of the products and burning of the product at the broiling surfaces is avoided in spite of the fact that the broiling surfaces consist of metal, preferably cast iron, and in spite of the fact that only small amounts of fat have to be used.

In order to comply with this object the invention advises a method for broiling the products in which the products are positioned between a lower heated broiling surface and an upper heated broiling surface and are broiled substantially by means of contact between the products and the heated broiling surfaces, the method being characterized in that the products are moved in relation to the broiling surfaces during the broiling.

In a preferred embodiment of the method according to the invention the broiling surfaces are periodically moved in a transverse direction from each other during the broiling cycle so that the products are alternately in contact with both broiling surfaces and in contact with only one broiling surface. It is also suitable that the method according to the invention is conducted in such a way that the moving of the products is conducted intermittently and that the products are moved substantially only while being in contact with only one broiling surface.

Due to the movement of the products in relation to the broiling surfaces in accordance with the method according to the invention the burning of the products to the broiling surfaces is avoided. By the defined combination of intermittent movement of the product and periodical movement of the broiling surfaces from each other there is provided without problems a movement of the products along the broiling surfaces also in the case that said surfaces consist of a conventional material, preferably cast iron, and a small amount of fat is used.

The device for conducting the method according to the invention comprises a lower, heatable broiling surface and an upper, heatable broiling surface, the broiling surfaces being adapted to broil the product substantially by contacting one side of the products each, the device according to the invention being characterized in that it comprises a transport device of moving the products between and in relation to the broiling surfaces.

The invention is described in the following with reference to the accompanying drawings.

FIG. 2 is an end view of the broiling device according to FIG. 1.

Figure 1:
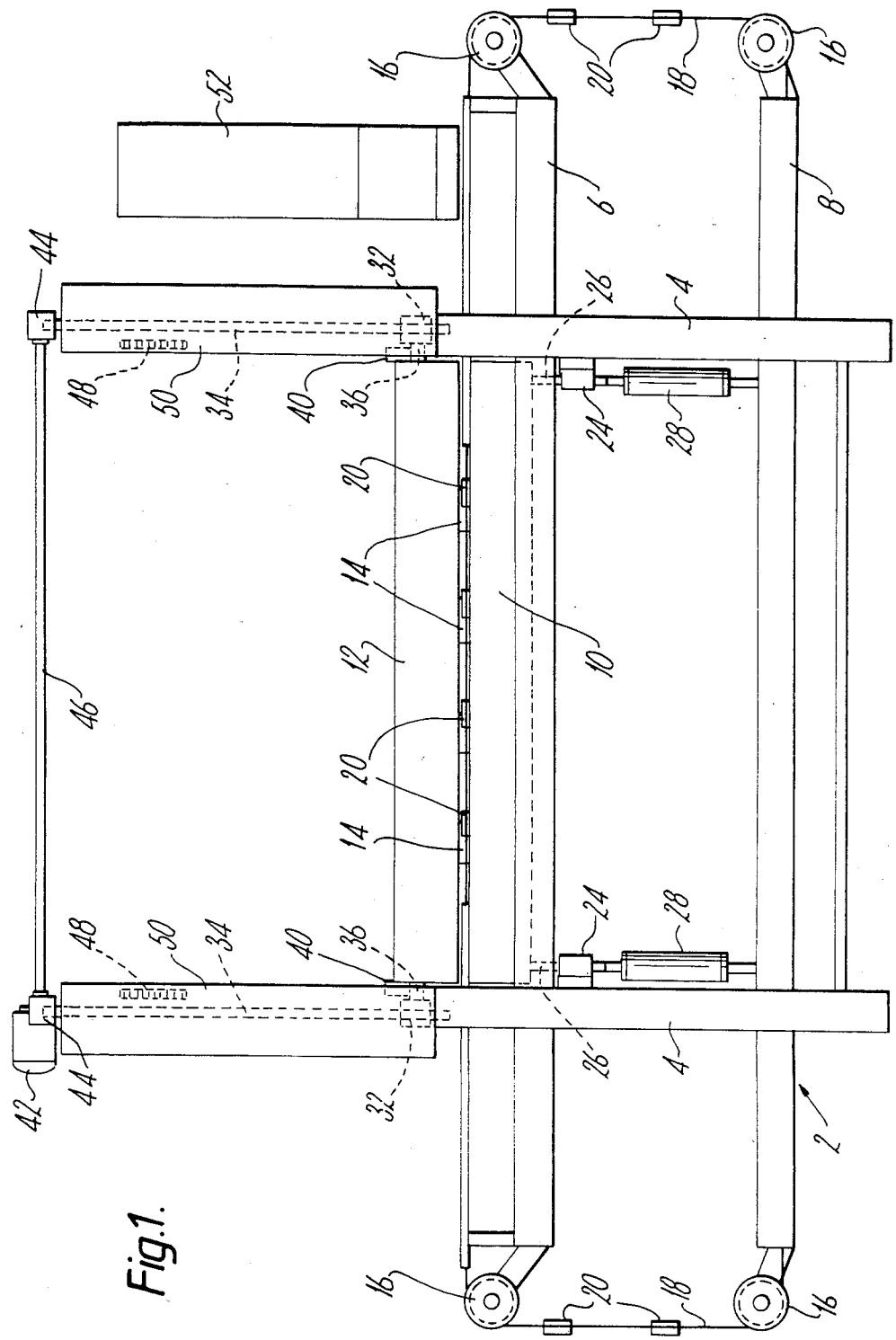
FIG. 1 is a side view of a broiling device according to the invention.

The broiling device shown in the drawings is intended for continuous broiling of food products. The broiling device is especially advantageous with regard to the fact that it obviates the problem of broiling food products which are not rollable, preferably flat food products, for example hamburgers, even if the device can be used also for rollable food products, such as meat balls.

The broiling device comprises a frame 2, the main portions of the frame consisting of four legs 4 and upper longitudinal beams 6 and lower longitudinal beams 8 which in pairs are connecting the legs 4 with each other at the two sides of the frame 2. The broiling device also comprises a lower broiling unit 10 and an upper broiling unit 11 between which food products 14 to be broiled in the broiling device are transported.

Figure 3A:
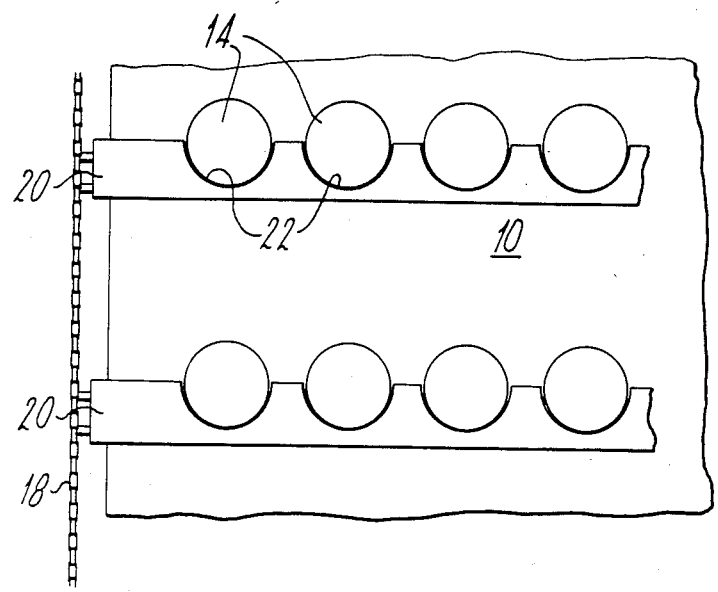
FIGS. 3a and 3b are a schematic plan view and a schematic side view, respectively, showing on an enlarged scale the movement of products in the broiling device.
Figure 3B:
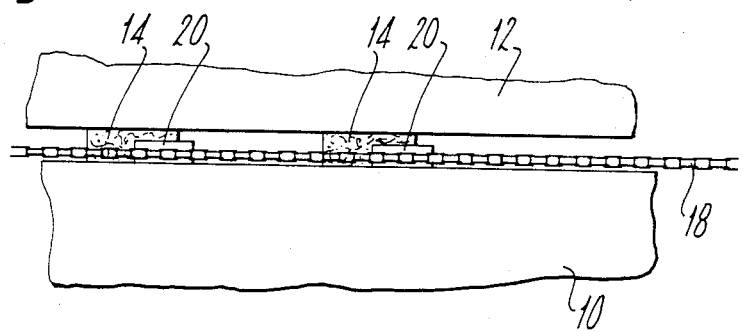

The device for moving the food products 14 between the broiling units 10 and 12 consists of two endless chains 18 positioned at opposite sides of the broiling device and extending around sprockets 16, conveyer elements 20 extending transversely between the chains and a driving motor (not shown) for driving the chains. As most clearly shown in FIG. 3a the conveyer elements 20 are at their ends connected with the chains 10 and are provided with recesses 22 having a shape which is adapted to the shape of the food products 14 to be broiled in the broiling device.

The lower broiling unit 10 is supported by the frame 2 by means of four support beams 24 which in pairs are connected with the ends of the broiling unit 10. The outer ends of the beams 24 are rotatably connected with each of the legs 4 and support the lower broiling unit 10 somewhat inside their outer ends by means of support elements 26 which are rotatably connected with the support beams 24. The inner ends of the beams 24 are in pairs connected with piston-cylinder-units 28. The piston-cylinder-units 28 are supported by cross beams 30 extending between the legs 4 of the frame. By means of the piston-cylinder-units 28 it is possible to raise and lower the lower broiling unit 10 because of the facts that the pistoncylinder-units provide a limited rotational displacement of the beams 24. The object of the rasing and lowering of the lower broiling unit 10 will appear from the following.

The upper broiling unit 12 is supported by support blocks 32 in turn supported by vertical, rotatably journalled, threaded spindles 34 extending through threaded openings in the support blocks 32. The upper broiling unit 12 is tiltably connected with the support blocks 32 by means of pins 36 extending into the support blocks. At each end the upper broiling unit 12 is provided with a half circular disc 40 formed with gears 38. The discs 40 are firmly connected with the broiling unit 12.

The spindles 34 are driven by means of motor 42 which through gears 44 and a shaft 46 is connected with the spindles 34. On rotation of the spindles 34 the support blocks 32 are rased or lowered dependent on the rotational direction of the spindles 34 the broiling unit 12 thereby being displaced together with the blocks 32. The height adjustment of the broiling unit 12 is utilized for adjusting the distance of the broiling unit 12 from the broiling unit 10 which is suitable with regard to the thickness of the food products to be broiled in the broiling device.

Figure 4A:
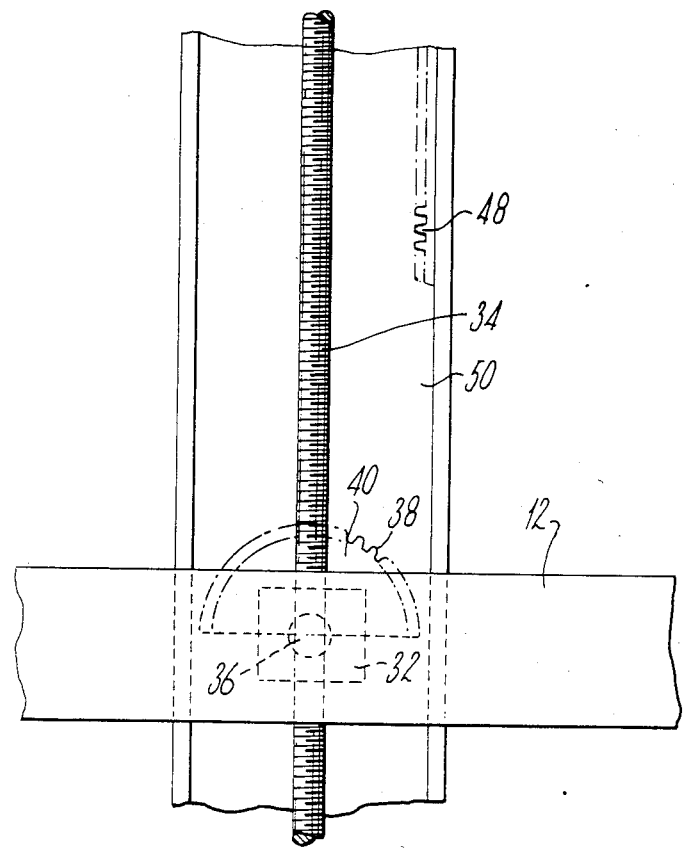
FIGS. 4a and 4b are schematical views showing on an enlarged scale the adjustment of the height position of an upper broiling unit included in the broiling device and the turning thereof for facilitating the cleaning, respectively.
Figure 4B:
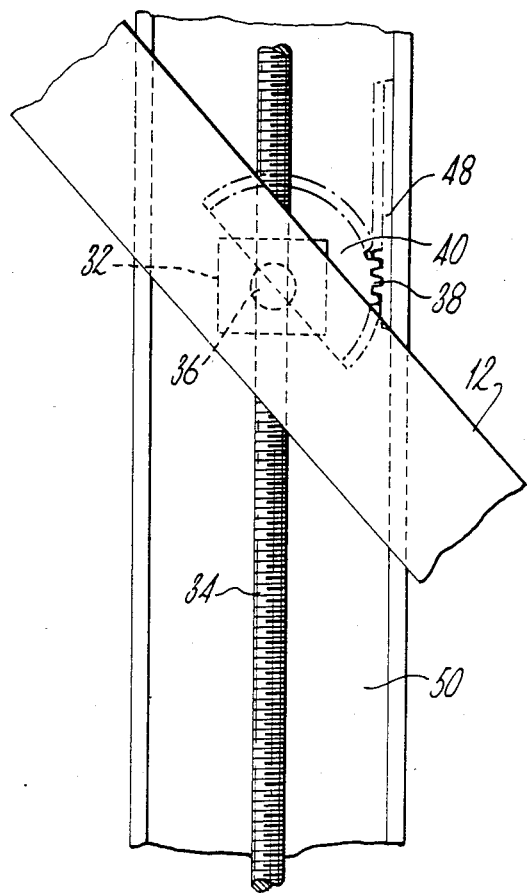

The raising of the upper broiling unit 12 takes place also when the broiling unit 10 and 12 shall be made available for cleaning. In order further to facilitate the cleaning of the upper broiling unit 12 this unit is adapted to be tilted to an open position according to FIG. 4b. The tilting movement is created by the fact that the discs 40 engage racks 48 when the broiling unit 12 is rased, the racks 48 being positioned on protective and retainer portions 50 positioned in connection with the spindles 34 and supporting the gears 44 and the motor 42. When the discs 40 arrive into engagement with the racks 48 during the upwards directed movement of the upper broiling unit 12 the discs are rotated so that the broiling unit 12 is tilted to the desired, opened position.

The broiling of the food products 14 which for example can be constituted by hamburgers take place while the food products are conveyed between the broiling units 10 and 12 which are heated. The food products are supplied to the broiling units by means of a feed device 52 which is adapted to give the food products 14 a suitable shape as well as to position the shaped products 14 on a feed table in suitable position for the products to be engaged by the conveyer elements 20.

In the embodiment shown the broiling units 10 and 12 consist of several sections clamped in frames. Preferably the broiling surfaces of the broiling units consist of cast iron and the heating of the broiling surfaces is provided by means of electric resistance heating element provided inside the broiling units. It is suitable that it is possible to heat the sections of the broiling units to different temperatures. Thereby it is possible to heat the upper and the lower broiling unit to different temperatures, for example to heat the upper broiling unit 12 to a higher temperature than the lower broiling unit 10, as well as to heat the broiling units to different temperatures at different section thereof, for example so that the broiling units have a higher temperature at the entrance end (the right end of the broiling device of FIG. 1) than at the discharge end thereof. The broiling device according to the invention provides the broiling of the products 14 conveyed between the broiling units 10 and 12 substantially by the contact between the products and the heated broiling surfaces, the products being displaced in relation to the broiling surfaces during the broiling. As mentioned above, the products 14 are moved between the heated broiling units 10 and 12 by means of the conveyer elements 20 to which the products 14 arrive from the feed device 52. The products 14 leave the broiling units at the left end of the broiling device of FIG. 1 in a ready to eat condition and thereby arrives to discharge table, which is not shown in the figures.

In accordance with a prefered embodiment of the method and the device according to the invention the lower broiling unit 12 is displaced between an upper and a lower position, so that the products 14 are alternately in contact with both of the broiling units 10 and 12 and in contact with only the lower broiling unit 10. The displacement of the lower broiling unit 10 is provided by activating the piston-cylinder-units 28 through the support beams 24 as described above. The size of the displacement is preferably adjusted so that it is less than the thickness of the conveyer elements 20. Thereby it is avoided that the conveyer elements 20 are moved completely below the products 14 if the products happen to adhere the upper broiling unit 12 when the lower broiling unit 10 is lower. Due to this adjustment of the size of the displacement there is in all conditions maintained an engagement between the conveyer elements 20 and the products. A suitable size of the displacement is 3-5 millimeters.

The driving of the conveyer elements 20 by means of the chains 18 and the displacement of the products 14 caused thereby is preferably conducted in an intermittent way so that the products 14 are displaced substantially only while the lower broiling unit 10 is in its lowered position and the products 14 are in consequence therewith in contact only with the lower broiling unit 10. The controlling of the intermittent displacement of the conveyer elements 20 can be provided by means of an inductive transmitter counting the number of teeth of the sprockets 16 passing the transmitter.

By heating the upper broiling unit 12 to a higher temperature than the lower broiling unit 10 the products 14 will be uniformly broiled in spite of the fact that the products will contact the lower broiling unit 10 for a longer time than the upper broiling unit 12 during the conveying between the broiling units.

Figure 5:
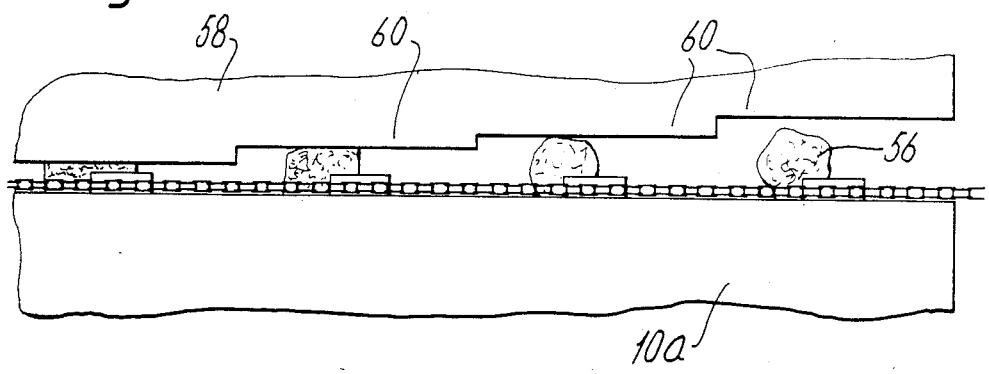
FIG. 5 shows a portion of a modified embodiment of a broiling device according to the invention.

In FIG. 5 there is shown how the lowering and raising of the lower broiling unit which in FIG. 5 is designed with reference numeral 10a can be utilized for shaping lumps 56 of for example sliced meat into flat products 14, for example hamburgers. As appears from FIG. 5 the shaping is provided because of the fact that the upper broiling unit 58 at its entrance end if formed with a steplike portion 60. The feeding of the lumps 56 into the successively smaller spaces between the lower broiling unit 10a and the upper broiling unit 58 takes place while the lower unit 10a is in its lowered position. When the feeding movement has been stopped the lower units 10a is raised so that the lumps 56 are flatened. It is realized that the lumps 56 are successively flatened until they have a thickness which corresponds to the distance between the lower broiling unit 10a and the upper broiling unit 58 in the raised position of the lower unit 10a. For the rest the broiling of the products 14a in the broiling device according to FIG. 5 is conducted in the same way as described with reference to FIGS. 1–4.

Thanks to the displacement of the products in relation to the broiling units during the broiling burning of the products to the broiling units is avoided in spite of the fact that the broiling surfaces of the broiling units consist of a conventional material, for example cast iron, and in spite of the use of limited amounts of fat. Due to the combination of intermittent displacement of the products and displacement of the products only while the products are in contact with only the lower broiling unit there is provided a displacement of the product which is completely without problems as the resistance against the displacement is very small.

The method and the broiling device according to the invention can be modified within the scope of the following claims. Thus the invention is limited only to a method and of a broiling device, in which the broilng is provided substantially by contact between the products and the heated broiling surfaces and the products are displaced in relation to the broiling surfaces during the broiling. In the broiling device described with reference to the drawings the products are at each moment displaced in relation to and in contact with only one of the broiling surfaces. Thus, the displacement of the products is avoided while the product is in contact with the two broiling surfaces while being at the same time displaced in relation thereto. Said simultaneous movement in relation to and contact with the two broiling surfaces can be avoided also in an other way than the described displacement of the broiling surfaces from each other during the displacement of the products in relation to the broiling surfaces. Thus, in a modified embodiment of the method and the device according to the invention it is possible to have the products contacting the broiling surfaces without interruption while one of the broiling surfaces accompanies the products during the intermittent displacement of the products in relation to the other broiling surfaces so that there is created a relative displacement of the products in relation only to one broiling surface at a time. The broiling surface having accompanied the displacement of the products is thereupon returned to its starting position while the products are maintained without being displaced in relation to the broiling surface in relation to which the products were at first displaced.

Also in other respects the invention can be modified within the scope of the following claims. For example it is possible to design the conveyer device for the products in another way than the design described with reference to the drawings.

I claim:

1. A method for broiling food products, said method comprising the steps of:
   positioning the products between a lower heated broiling surface and an upper heated broiling surface for broiling the food products by contacting corresponding sides of said food products;
   periodically displacing said broiling surfaces transversely relative to each other during the broiling of said food products so that said food products are alternately in contact with both of said broiling surfaces and in contact substantially with only one of said broiling surfaces; and,
   intermittently displacing said food products linearly relative to said broiling surfaces so that each of said food products are conveyed between said broiling surfaces and are contacted by different areas of both of said broiling surfaces during the broiling of said food products, said periodic displacement of said broiling surfaces and said intermittent displacement of said food products being such that during said conveyance said food products are in contact substantially with only one of said broiling surfaces relative to which said food products are being linearly displaced.

2. A method as claimed in claim 1, in which the products are displaced substantially only while in contact with the same one of said broiling surfaces.

3. A method as claimed in claim 1, in which the products are alternately in contact with the lower as well as the upper broiling surface and in contact with only the lower broiling surface, and in which the upper broiling surface is heated to a higher temperature than the lower broiling surface.

4. A method according to claim 1 in which said products are shaped by contact with upper and lower broiling surfaces having a plurality of steps that are at stepwise reduced distances from each other as said products are conveyed between said broiling surfaces in a direction of product displacement away from an entrance end of said broiling surfaces.

5. A method according to claim 1 in which said products are conveyed between said broiling surfaces by conveyor elements extending between two endless chains positioned one on each side of said broiling surfaces.

6. A method as claimed in claim 1 in which said products are intermittently displaced relative to only one of said broiling surfaces at a time.

7. A method as claimed in claim 6, in which one of the broiling surfaces accompanies the products in immovable contact therewith while the products are displaced in relation to and in contact with the other of the broiling surfaces, and in which said one broiling surface is displaced in relation to and in contact with the products while the products are maintained in an immovable position in relation to said other broiling surface.

8. A device for broiling food products, said apparatus comprising:
   a lower heated broiling surface and an upper heated broiling surface for broiling the products by contacting corresponding sides of said products;
   displacing means for periodically displacing said broiling surfaces transversely relative to each other during the broiling of said food products so that said food products are alternately in contact with both of said broiling surfaces and in contact substantially with only one of said broiling surfaces; and,
   conveyer means for positioning said food products between said broiling surfaces and intermittently displacing said food products linearly relative to said broiling surfaces so that each of said food products are conveyed between said broiling surfaces and are contacted by different areas of both of said broiling surfaces during the broiling of said food products, said periodic displacement of said broiling surfaces and said intermittent displacement of said food products being such that during said conveyance said food products are in contact substantially with only one of said broiling surfaces relative to which said food products are being linearly displaced.

9. A device as claimed in claim 8, in which said displacing means includes means for periodically displacing the broiling surfaces between a relative position in which the surfaces are in contact with one side each of the products and a position in which the upper broiling surface is positioned above the products.

10. A device as claimed in claim 9 in which the conveyer means is inactive when the broiling surfaces take the position in which they are in contact with one side each of the products and includes means for displacing the products on the lower broiling surface when the broiling surfaces take the position in which the upper broiling surface is positioned above the products.

11. A device as claimed in claim 10, which further comprises means for shaping said products, and in which said shaping means includes an upper broiling surface having at an entrance end of the device a plurality of steps at stepwise reduced distances from the lower broiling surface in a direction of product displacement away from the entrance end.

12. A device as claimed in any one of the claims 9, 10, 11 or 8, in which the conveyer means comprises conveyer elements displaceable along the broiling surfaces.

13. A device as claimed in claim 12, in which the conveyer elements extend between two endless chains positioned at one side each of the broiling surfaces.

14. A device as claimed in claim 8, in which said displacing means includes means for displacing the broiling surfaces in parallel with each other.

* * * * *